United States Patent [19]

Lohr

[11] 4,296,691
[45] Oct. 27, 1981

[54] APPARATUS FOR USE ON VEHICLE TRANSPORTERS

[76] Inventor: Robert Lohr, 14, rue du 14 Juillet, 67980 Hangenbieten, France

[21] Appl. No.: 941,246

[22] Filed: Sep. 11, 1978

[30] Foreign Application Priority Data

Sep. 16, 1977 [FR] France .................. 77 28555

[51] Int. Cl.³ .................. B60P 3/06; B61D 3/06
[52] U.S. Cl. .................. 105/370; 105/375; 105/422
[58] Field of Search ............ 105/340, 370, 422, 371, 105/372, 375

[56] References Cited

U.S. PATENT DOCUMENTS

| | | | |
|---|---|---|---|
| 795,850 | 8/1905 | Naughton | 105/370 |
| 1,231,657 | 7/1917 | Shelton | 105/370 |
| 3,524,563 | 8/1970 | McCartney et al. | 105/370 |
| 3,670,664 | 6/1972 | Thornton | 105/377 |
| 3,998,167 | 12/1976 | Gompel | 105/368 R |

Primary Examiner—Richard A. Bertsch
Attorney, Agent, or Firm—Prutzman, Kalb, Chilton & Alix

[57] ABSTRACT

The present invention relates to vehicle transporters. Apparatus for totally or partially lowering or raising the upper platform of a vehicle transport trailer comprising a lower platform disposed on a chassis and an upper platform supported at a distance from the lower platform by at least four vertical support posts, characterized in that it comprises at least one motor driving in rotation at least two vertical screws each lodged in one of the support posts of a given pair; the rotation of the screws producing the vertical displacement of means rigidly connected to the upper platform.

12 Claims, 11 Drawing Figures

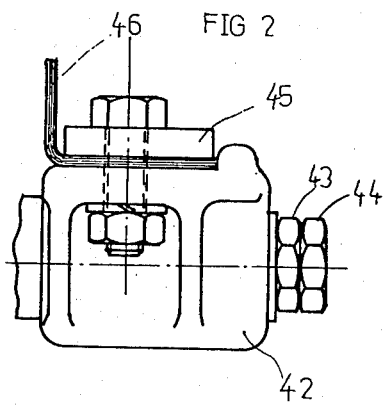
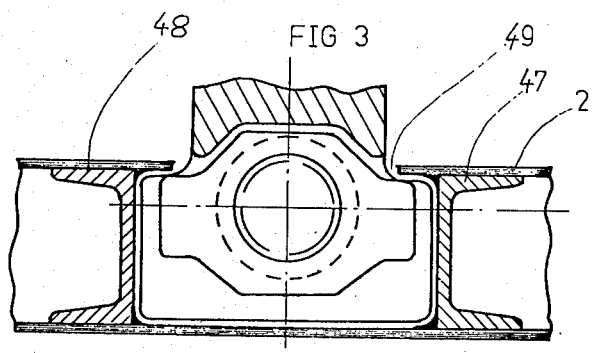

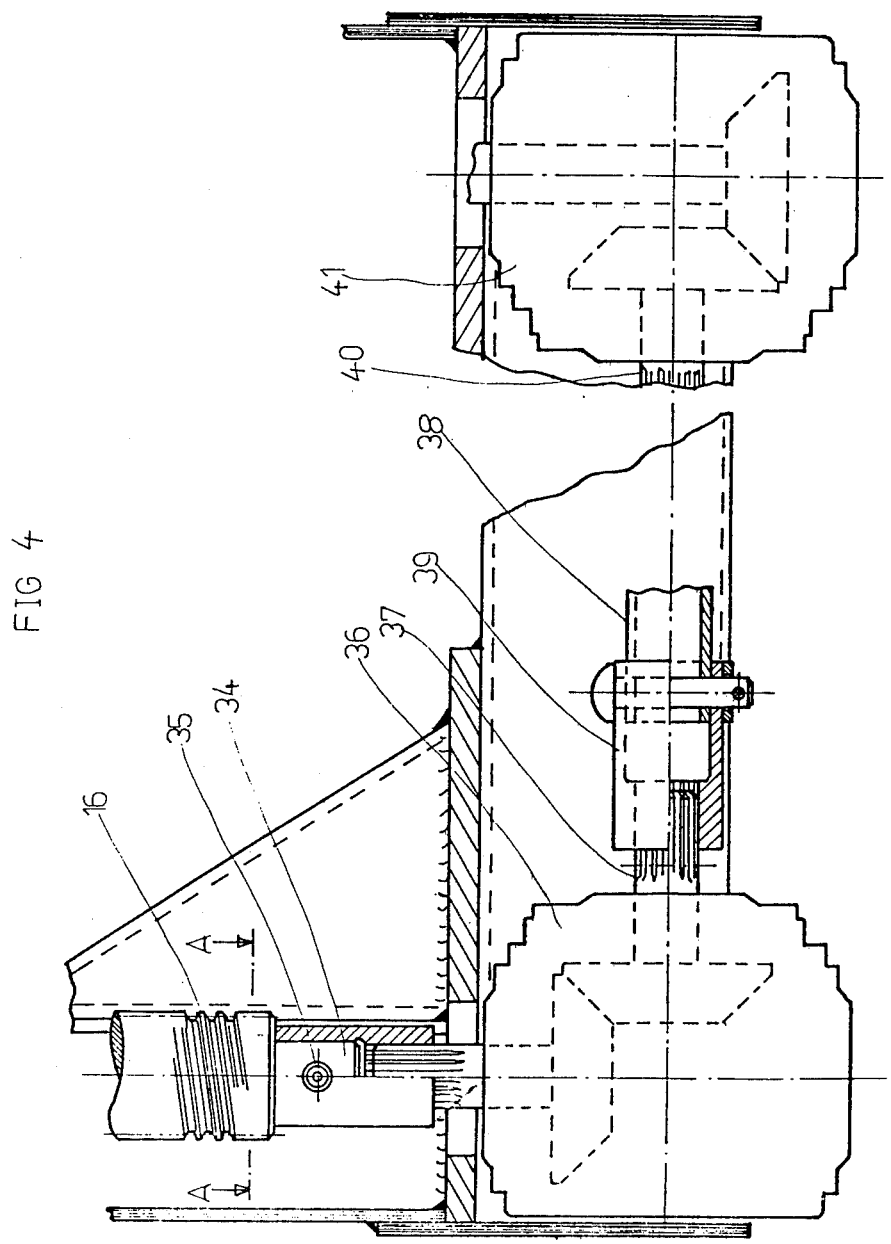

APPARATUS FOR USE ON VEHICLE TRANSPORTERS

BACKGROUND OF THE INVENTION

1. Field of the Invention

The present invention relates to vehicles used to transport a plurality of automobiles or commercial vehicles, more specifically, vehicle transporters.

These transporters generally comprise a carrier vehicle and a trailer, each comprising two levels consisting of a lower platform and an upper platform. The lower platform is stationary and is disposed directly on the chassis of the trailer. The upper plaform is supported at a distance from the lower platform by means of support posts which may be stationary or partly movable. It is designed to be lowered onto the lower platform. The lowering and raising of the upper platform is still accomplished in conventional units by means of jacks which act either on cables or directly on pivotable support posts, as described, for example, in French Pat. No. 2 213 856 belonging to the Applicant.

However, these devices for manoeuvering the upper platform have various disadvantages. Firstly, they necessitate large support posts, particularly in the case of pivotable posts, thereby reducing the useful space on the trailer. When cables are used it is also necessary to systematically replace them periodically to avoid the risk of breakage. Finally, in all cases, the driver of the unit has to engage or withdraw safety pegs before loading or unloading.

SUMMARY OF THE INVENTION

The present invention is designed to obviate these disadvantages by proposing new apparatus for displacing the upper platform of the trailer of a vehicle transporter. The new apparatus is designed to eliminate the need for jacks and cables and does not require the direct manual intervention of the driver other than to start and stop a motor. It also satisfies all the safety requirements needed during transportation and manoeuvering.

According to the invention this result is obtained with an apparatus for lowering or raising, either partially or totally, the upper platform of a vehicle transporter trailer of the type comprising a lower platform disposed on a chassis and an upper platform which is supported at a distance from the lower platform by at least four vertical support posts disposed in pairs. This apparatus is characterized in that it comprises a motor which drives in rotation at least two vertical screws each lodged in one of the support posts in a particular pair; these screws engaging the means supporting the upper platform and integral with the same and displacing the upper platform in a vertical translational movement via these means.

Any type of motor can be considered for the described application but a hydraulic motor is preferably used. Obviously, this motor will be equipped with all conventional elements which are known per se, such as a pump and distributors.

Preferably, and generally, vehicle carrying trailers comprise four vertical support posts disposed in pairs. According to a feature of the invention, at least two posts in a given pair will be equipped with a vertical screw which is suspended inside the post.

The movement of the motor is transmitted to the screws by means of shafts and angular cranks, the quantity, type and disposition of which are dependent on the number of motors employed and their respective position on the trailer.

As indicated above, there are preferably four support posts and they are arranged in pairs on either side of the platforms. One pair supports the front part of the upper platform and the other pair the rear part. When a hydraulic motor is used to drive the screws only one motor need be used but the transmission system must be more complicated as the movement has to be transmitted to four screws which are disposed far apart from one another.

According to the invention a hydraulic motor can also be connected to each pair of supports. This allows independent operation of the supports by supplying the motor separately. When the motors of the front and rear pairs are supplied simultaneously the upper platform is lowered in the horizontal position onto the lower platform. This enables commercial vehicles or trucks to be transported.

According to the invention the motors can be situated in any position on the trailer but there are also certain preferred positions.

For example, the motor for a pair of supports can be disposed on the chassis between these supports.

However, while this location may provide satisfactory results it can also present certain disadvantages over other possibilities. For example, this solution requires too many angular cranks and also results in the control elements being disposed far away from the motor.

For these reasons, while every location is theoretically possible, it is preferred according to the invention to dispose the motor or motors in vertical alignment with the corresponding support post or posts. According to the invention the hydraulic motors are preferably located at the base of the corresponding suuports as locating them above the supports would risk deterioration of the motors through exposure and would also limit the useful space.

The location of the motors according to the invention beneath the support posts satisfies all requirements in terms of safety and ease of operation, particularly as regards the transmission system.

The vertical screws located inside the support posts but are preferably suspended in such a way as to avoid the possibility of ignition which would require their replacement. They can be suspended by any suitable means such as a prestressed ball bearing resting on the top of the post.

The pitch of the screws, which are all identical, is as small as possible but allows for a relatively rapid manoeuver so as to render the apparatus irreversible when the upper platform is loaded and to avoid the use of pins for position locking.

The means engaged by the vertical screws are preferably support forks which have a dual function: firstly they support the upper platform and secondly, they drive it in a vertical translational movement. The forks may be directly engaged by the screws, i.e., the forks may be provided with corresponding axial threading. Preferably, engagement is made indirectly by means of a drive screw situated between the two arms of the fork.

According to this embodiment the screw driving the fork is only acted on by axial forces as the design of the system eliminates the development of a parasitic couple capable of producing partial binding of the nut on the screw which would increase the couple needed to operate.

The support forks according to the invention are also all provided with a fixed horizontal axis disposed at right angles to the axis of the vehicle on which the upper plaform is pivotably mounted by means of a connecting element.

The pivot mounting on the forks of the front support posts is such as to allow simple rotation of the upper platform about the horizontal axis of the fork, the platform being attached by any conventional means to the connecting element rotatably mounted about the axis.

In the case of the forks of the rear support posts the pivot mounting of the upper platform should not only permit rotation of the latter about the horizontal axis but also the possible sliding of the upper platform if the screws at the front and rear of the platform are not turned simultaneously. This result can be achieved by means of a connecting piece which is rotatably mounted about the horizontal axis of the support fork and equipped with a guide in which slides a groove provided on the upper platform parallel to its longest side. The sliding action is directed at right angles to the horizontal axis of the support fork.

In another embodiment of the invention the two front support posts are not equipped with screws but merely a pivot mounting for rotation of the platform. Only the rear support posts are equipped with screws according to the invention.

The invention will now be described in greater detail with reference to a preferred embodiment and the accompanying drawings.

BRIEF DESCRIPTION OF THE DRAWINGS

FIG. 2 is a detailed view of a pivotable front fork.

FIG. 3 is section A-A of FIG. 4.

FIG. 4 diagrammatically represents the method of transmitting the movement of the motor to the screw situated in the post which does not support the motor.

DESCRIPTION OF THE PREFERRED EMBODIMENT

Figure 1:
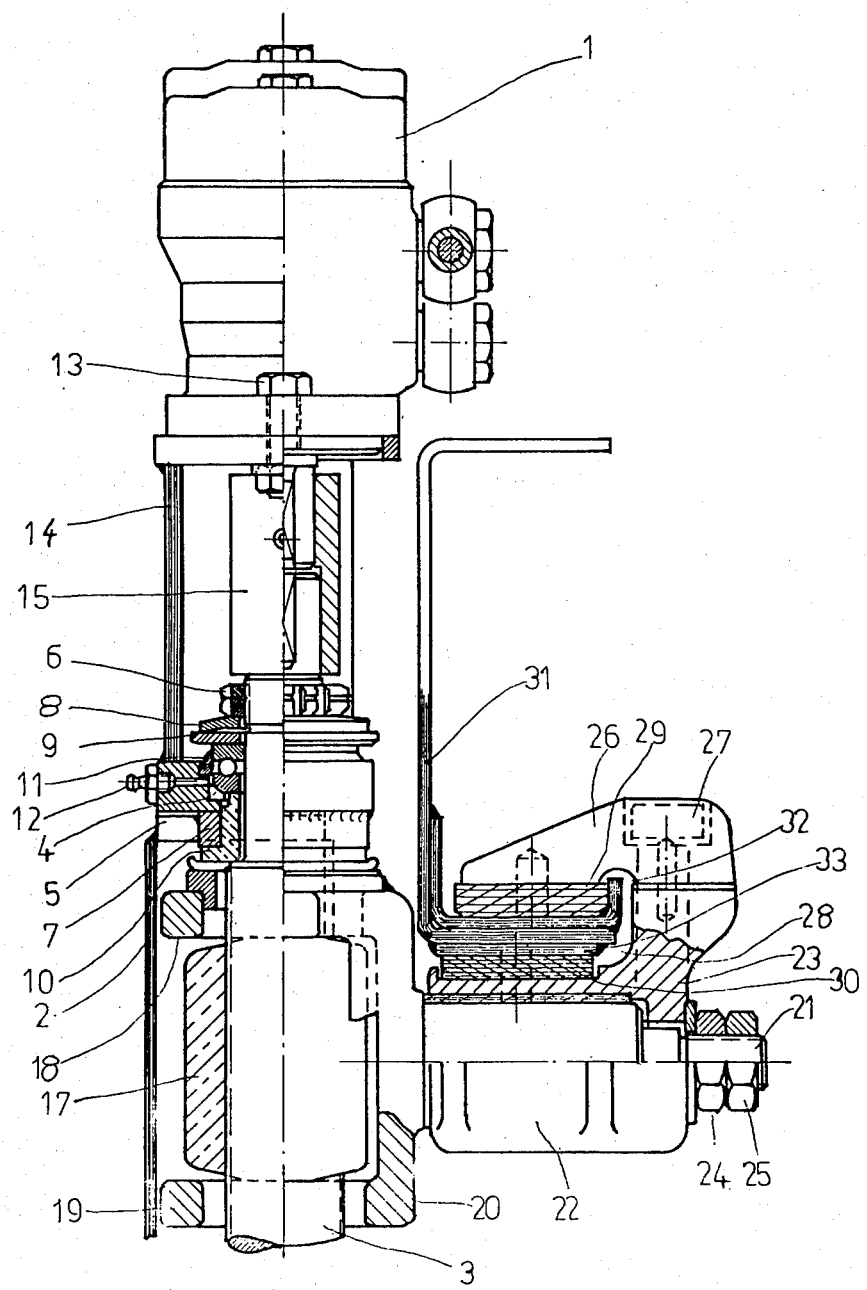
FIG. 1 is a detailed view of a pivotable rear fork with the hydraulic motor situated above one of the posts in a given pair.
Figure 5:
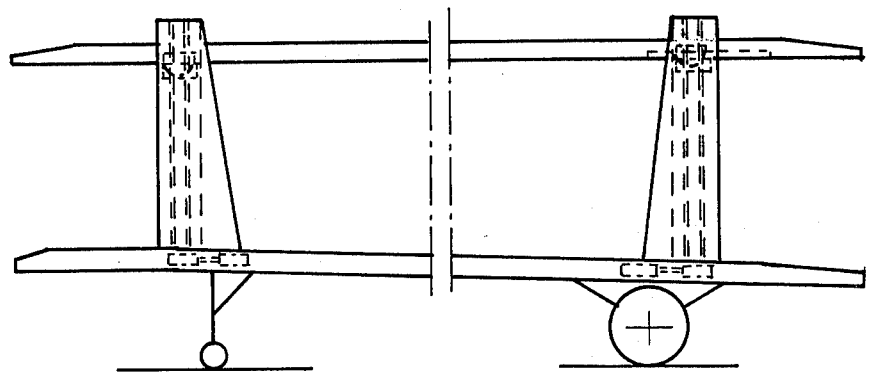
FIGS. 5, 6 and 7 are diagrammatic views of the transporter with the upper platform in a high position, a low position and a possible intermediate position.
Figure 6:
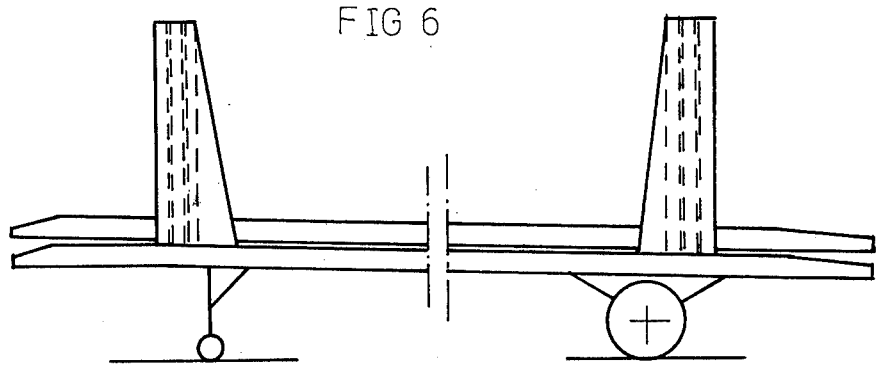

The device consists of a hydraulic motor 1 which in this drawing is situated above a post 2 and which rotates a screw 3.

The screw 3 is suspended by means of a prestressed ball bearing 4 supported on the top 5 of the post 2. The screw is held in place by means of a notched nut 6. The prestressing of the ball bearing 4 which is disposed on a bearing support plate 7 is ensured by the insertion of a flexible washer 8 and a simple washer 9 between the screw and the bearing. The prestressing prevents the screw from jumping, thereby preventing wear of the bearing. Perfect rotation of the screw is ensured by means of a guide ring 10, a scraper 11 and a lubricator 12. It is also possible to provide a wedge 9 between the bearing and the top of the post.

The motor 1 is attached by a screw-nut unit 13 to a support 14 which is supported on the upper part of the post and is attached to the latter.

Rotation of the screw by the motor is achieved by means of a conventional coupling 15.

The screw comprises threading with a low pitch over its entire width and as it rotates it causes the vertical translation of a nut 17 consisting, for example, of bronze. This nut 17 is disposed between the two arms 18,19 of the support fork 20.

The fork 20 also comprises an axis or pivot pin 21 disposed at right angles to the screw 3 and rotatably mounted about the base 22 of a guide 23 locked in place by nuts 24,25. The guide also comprises a guide lever 26 which is attached to the base by means of a screw-nut unit 27. The guide lever and the base of the guide define an inner space 28, on the horizontal faces of which are attached two plates 29,30 which are made of a synthetic material and ensure that a groove 31 of the upper platform will slide well.

At its lower part the screw 3 is equipped with a fluted sleeve 34 which is attached to the former by means of flexible pins 35. This fluted sleeve rotates an angular crank 36 in a normal direction. The output of this angular crank is connected to a shaft 38 by an identical system to the fluted sleeve 39. An angular crank 41 mounted in the opposite direction is disposed at the other end 40 of the shaft 38. This angular crank 41 is connected to the shaft 38 in the same way as the end of the angular crank 36.

The forks 20 of the front pair of support posts are equipped with a pivotable guide 42 attached by nuts 43,44 to the corresponding fork and by a screw-nut unit 45 to the groove 46 in the upper platform.

The support posts are internally reinforced by inner sectional pieces 47,48. Along the entire length of the inner face of the support post 2 is an opening 49 which allows the vertical translation of the support forks.

Figure 10:
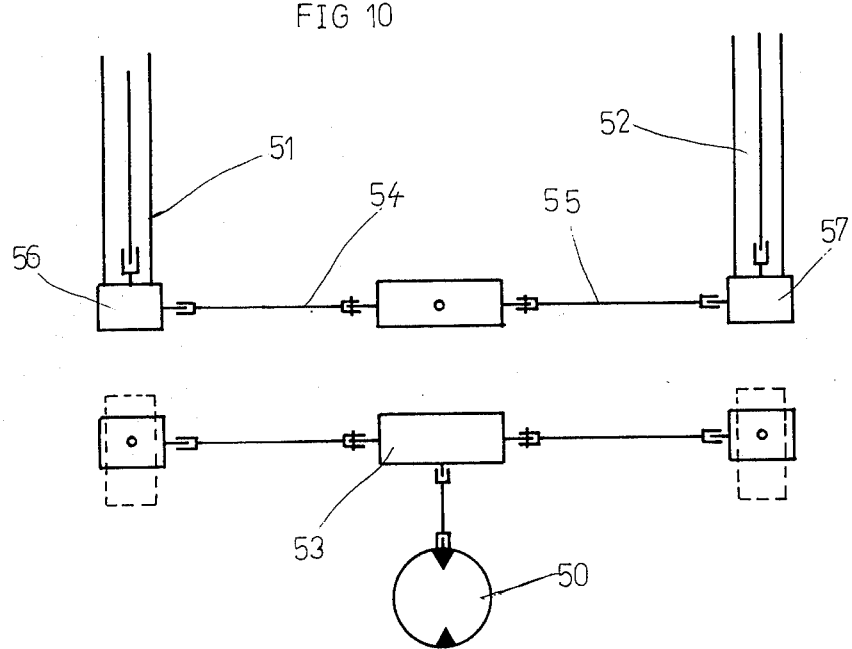
FIG. 10 is a diagram of the transmission system employed when the motor to a given pair of posts is located on the chassis between these posts.
Figure 11:
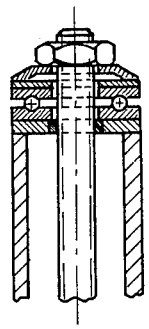
FIG. 11 is a diagram of the method of securing and guiding the screw in the support post according to FIG. 10.

In FIG. 10 the hydraulic motor 50 disposed on the chassis between the two posts 51,52 in a given pair drives a central angular crank 53 comprising two opposite output shafts 54,55 which each drive two lateral angular cranks 56,57 rotating the screws. The double output angular crank is designed to ensure the opposite rotation of the shafts 54 and 55 so that the direction of rotation of the two screws belonging to a particular pair of support posts is the same, thus permitting simultaneous displacement.

The modus operandi is as follows: When the upper platform is in the raised position, the supplying of the hydraulic motor for the rear pair of supports causes the rear support forks to be lowered and thus the upper platform is inclined and the groove slides in the guide.

If the front pair of supports is equipped with a hydraulic motor the two motors can be simultaneously supplied and the upper platform can remain horizontal during the lowering operation.

Figure 7:
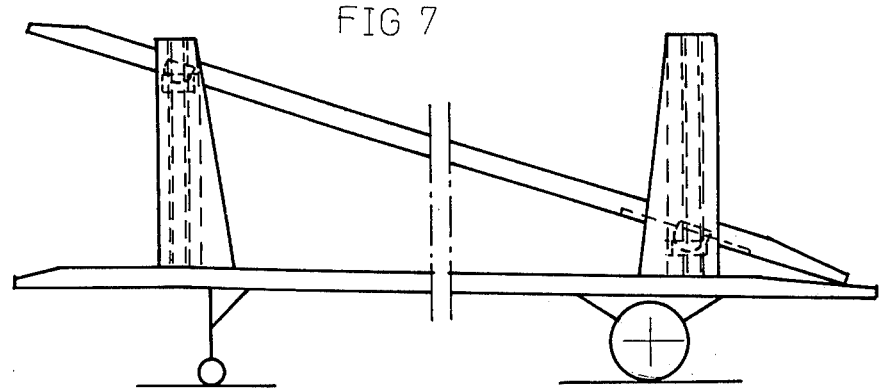
Figure 8:
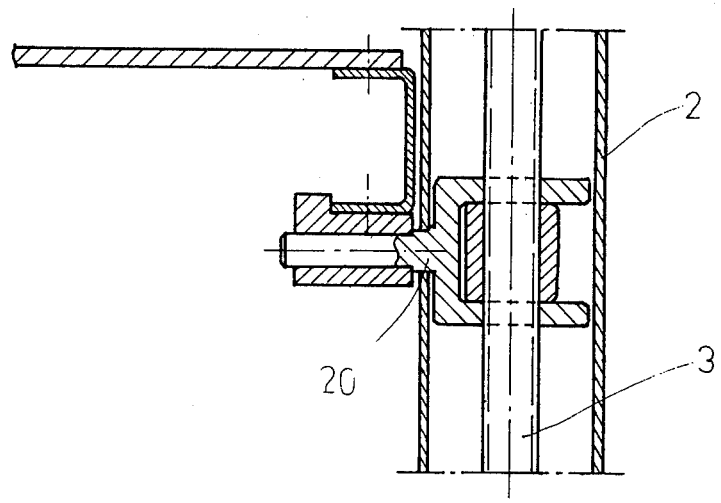
FIGS. 8 and 9 are diagrammatic views of the modus operandi of the front and rear support forks.
Figure 9:
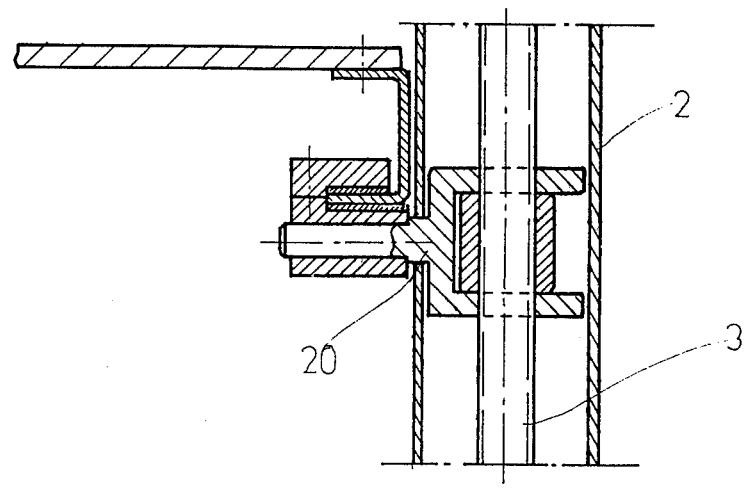

If the front pair of supports is neither equipped with a hydraulic motor nor a translation screw the upper platform will pivot about the supports on the front posts and will be inclined as shown in FIG. 7.

The platform is raised by supplying the motors in such a way as to obtain rotation in reverse, thereby changing the direction of rotation of the screws.

What is claimed is:

1. In an apparatus for vertically moving an upper platform of vehicle transporter trailer comprising a lower platform disposed on a chassis and an upper platform supported at a distance from the lower platform for movement toward and away from the lower platform, front and rear vertical support posts secured to the lower platform for supporting front and rear portions of the upper platform, vertical screws housed in at least one of said front and rear posts, drive means for rotating the screws, and a nut and guide assembly on each rotatable screw adapted for vertical displacement along the screw in response to rotation thereof by the drive means, said assembly supportably and drivably engaging the upper platform, the improvement wherein the nut and guide assembly comprises a screw driven nut vertically displaced upon rotation of the screw and a separate support fork disconnected from and resting on the nut for vertical movement therewith, said support fork being transversely moveable relative to the drive nut to permit guiding of the upper platform while only imposing axial forces on the screw and the drive nut.

2. Apparatus as claimed in claim 1, characterized in that the transmission means consist of a central angular crank comprising two opposite outputs simultaneously driving two lateral angular cranks at the foot of the corresponding screws.

3. Apparatus as claimed in claim 1, characterized in that the movement is transmitted to the vertical screws by a fluted sleeve connecting the shafts of the angular cranks to the vertical shafts in a slidable manner.

4. Apparatus as claimed in claim 1, characterized in that the upper platform is pivotably mounted about support forks along a horizontal axis perpendicular to the axis of the longest side of the vehicle.

5. Apparatus as claimed in claim 4, characterized in that at least the rear forks are equipped with an articulated guide in which a groove provided on the upper platform slides during its rotation.

6. Apparatus as claimed in claim 1, characterized in that the vertical screws are suspended in the support posts by means of prestressed ball bearings.

7. The apparatus of claim 1 wherein the separate support fork includes a pair of spaced arms and said screw driven nut is positioned between said arms for axial driving engagement therebetween substantially free of transverse stress.

8. The apparatus of claim 1 wherein the support forks include horizontal pivot pins and platform connecting members pivotably mounting on said pins, the connecting members on at least one of said front and rear support posts facilitating both rotational and sliding movement of the upper platform relative thereto to permit movement of said rear platform portion relative to said front platform portion.

9. The apparatus of claim 1 wherein at least one of said front and rear posts include a pair of posts and said drive means rotatably drives at least two vertical screws, each screw being mounted in one of said pair of posts to provide vertical movement of at least one of the front and rear portions of the upper platform relative to the other portion.

10. The apparatus of claim 9 wherein said drive means includes a motor for each pair of support posts.

11. The apparatus of claims 1, 9 or 10, wherein said drive means includes a motor mounted in vertical alignment with a support post.

12. The apparatus of claim 11 wherein the motor is mounted at the base of the post.

* * * * *